(12) United States Patent
Nowak et al.

(10) Patent No.: US 8,227,062 B2
(45) Date of Patent: Jul. 24, 2012

(54) PACKAGE HAVING A PRINTED LAMINATE

(75) Inventors: Michael Nowak, Seymour, WI (US); Cori K. Kohl, Appleton, WI (US)

(73) Assignee: Coating Excellence International LLC, Wrightstown, WI (US)

( * ) Notice: Subject to any disclaimer, the term of this patent is extended or adjusted under 35 U.S.C. 154(b) by 450 days.

(21) Appl. No.: 12/019,407

(22) Filed: Jan. 24, 2008

(65) Prior Publication Data
US 2008/0187695 A1 Aug. 7, 2008

Related U.S. Application Data

(60) Provisional application No. 60/887,631, filed on Feb. 1, 2007.

(51) Int. Cl.
*B32B 1/08* (2006.01)
*B32B 23/00* (2006.01)

(52) U.S. Cl. ...... 428/36.1; 428/34.1; 428/34.2; 428/35.7; 428/35.9; 428/36.9

(58) Field of Classification Search ...... 428/34.1, 428/35.7, 35.9, 36.9, 34.2, 36.1
See application file for complete search history.

(56) References Cited

U.S. PATENT DOCUMENTS

| | | | |
|---|---|---|---|
| 3,990,626 A | 11/1976 | Goodrich | |
| 4,008,850 A | 2/1977 | Goodrich | |
| 4,795,665 A * | 1/1989 | Lancaster et al. | 428/34.2 |
| 4,996,096 A * | 2/1991 | Dew | 428/216 |
| 6,367,976 B1 | 4/2002 | Bannister | |
| 6,381,870 B1 | 5/2002 | Kohlman et al. | |
| 6,800,051 B2 | 10/2004 | Koehn | |
| 6,991,592 B2 | 1/2006 | Wold et al. | |
| 7,111,986 B2 | 9/2006 | Marbler et al. | |
| 2002/0021844 A1 * | 2/2002 | Rusert et al. | 383/107 |
| 2003/0096128 A1 * | 5/2003 | Farley et al. | 428/500 |
| 2003/0223658 A1 | 12/2003 | Smith et al. | |
| 2004/0048084 A1 | 3/2004 | Rhee et al. | |
| 2004/0118728 A1 * | 6/2004 | Friedrich et al. | 206/423 |
| 2004/0132363 A1 | 7/2004 | Cosentino et al. | |
| 2005/0084185 A1 * | 4/2005 | Moon | 383/116 |
| 2006/0199717 A1 | 9/2006 | Marbler et al. | |
| 2007/0048480 A1 * | 3/2007 | Lavosky | 428/40.1 |
| 2007/0140600 A1 | 6/2007 | Nowak et al. | |
| 2007/0292053 A1 | 12/2007 | Lin et al. | |
| 2008/0292223 A1 | 11/2008 | Bannister | |
| 2009/0159192 A1 | 6/2009 | Bannister | |
| 2010/0029455 A1 | 2/2010 | Skopek et al. | |

FOREIGN PATENT DOCUMENTS

| | | |
|---|---|---|
| CA | 775426 | 1/1968 |
| CA | 875950 | 7/1971 |

OTHER PUBLICATIONS

International Preliminary Report on Patentability dated Aug. 13, 2009 in PCT/US2008/052303.
International Search Report in PCT/US 08/52303.

* cited by examiner

*Primary Examiner* — Marc Patterson
(74) *Attorney, Agent, or Firm* — Duane Morris LLP

(57) ABSTRACT

A package is fabricated with a first polymer film having reverse printed matter thereon, a second polymer film laminated to the first polymer film to provide a composite, wherein the printed matter is between the first and second polymer films, and a woven bag enclosed by the composite, wherein the second polymer film of the composite isolates the printed matter from cross contamination with contents intended for the woven bag.

16 Claims, 2 Drawing Sheets

PACKAGE HAVING A PRINTED LAMINATE

CROSS REFERENCE TO RELATED APPLICATIONS

This application claims the benefit of U.S. Provisional Patent Application No. 60/887,631, filed Feb. 1, 2007.

FIELD OF THE INVENTION

The invention relates to a laminated package or bag for packaging food and non-food items, and methods for making the same.

BACKGROUND

Typically woven bags are a reverse printed film poly (polymer) laminated by poly adhesive to a woven material to provide a structure (film/print/poly/woven). When the bags are filled with food (human and animal) products they frequently are filled hot and with grease added. As a result the moisture or grease or heat can attack the printing by migration through the poly and woven layers. Moreover, the printed film is subject to abrasion by the woven bag.

U.S. Pat. No. 7,111,986 discloses a package that utilizes a reverse printed film adhesive laminated to another film. This would be film/print/adhesive/film. Such a package is used for ream wrap and packaging cosmetics, and a variety of foods from potato chips, to pouches for a variety of edibles, such as, soup and dog treats.

SUMMARY OF THE INVENTION

A package is fabricated with a first polymer film having reverse printed matter thereon, a second polymer film laminated to the first polymer film to provide a composite, wherein the printed matter is between the first and second polymer films, and a woven bag enclosed by the composite, wherein the second polymer film of the composite isolates the printed matter from cross contamination with contents intended for the woven bag.

According to an embodiment of the invention, a combination of film/print/poly film/woven comprises an improvement over a package constructed of poly (polymer) film adhesive or poly laminated to woven.

Films laminated together are poly laminated by heating, melting and fusion of a poly film, or they are laminated together by being adhesive laminated to each other and to the woven bag. The second layer of poly film with the printing buried between two layers protects the print by providing a higher barrier to moisture and grease cross contamination, in addition to providing a supplemental barrier layer for the bag to resist opening of the bag by penetration of the printed film caused by damage to the bag. Further, the second layer of poly film increases the resistance to tensile forces to protect the woven bag from tearing when the bag as a whole is lifted or tugged upon.

A laminated and woven bag provides enhanced barrier properties preventing the contents intended for containment in the bag from attacking the print surface. The present invention would make a film layer as a composite of combined two films adhesive laminated or poly laminated together and forming respective barriers to isolate the ink therebetween.

The adhesive is provided by a thermoplastic or pre-polymerized thermoset adhesive material, transparent, translucent, opaque, semi-opaque, possessing color or lacking color, that is spread into a thin layer and activated to an adhesive state by one or more of, heat, pressure sensitivity or polymerization from a pre-polymerized state, for example, by extrusion, and then placed between the first printed poly film and the second poly film to form the composite.

The poly laminate comprises a thermoplastic or pre-polymerized thermoset polymer film that is supplied as a thin layer, then placed between the first printed poly film and the second poly film, followed by being activated to an adhesive state similarly as is the adhesive material, described herein. Advantageously, the invention eliminates the risk of cross contamination of inks and contents intended for woven bag contents. Moreover, the invention allows for risk free utilization of water based inks when packaging hot filled or greasy food products in woven bags. The composite protects the ink from abrasion by the woven bag.

The product is a multi layer bag embodiment comprising an outer layer of a reverse printed clear film (with a thickness in a range of about 9 microns to about 150 microns, including, but not limited to a preferred thickness of about 18 microns) adhesive laminated (with about 0.5 to 20 pounds per 3,000 sq feet of adhesive) to another film (clear, colored, metallized, or treated in some way), (with a thickness in a range of about 9 microns to about 150 microns, including, but not limited to a preferred thickness of about 18 microns). The film lamination is then poly laminated (with about 5 to about 30 pounds of poly per 3,000 sq feet) to a woven mesh tube or flat sheet (with a basis weight of about 30 to about 100 pounds per 3,000 sq feet of a single ply of woven). The material is then formed or cut into a bag.

The final structure is film/print/adhesive/film/poly/woven. The adhesive layer also could be a poly layer (of about 5 to 30 pounds per 3,000 sq feet) resulting in a structure film/print/poly/film/poly/woven. All product weights are based on a single layer of the structure, i.e. if it is a tube it is one side or layer of the tube.

DETAILED DESCRIPTION

US 2007/0140600 A1, U.S. patent application Ser. No. 11/538,838 filed on Oct. 5, 2006 discloses a woven bag laminated to a reverse printed film. Prior to the invention, the previously known method of making a product was reverse printing a film and poly laminating it to a woven bag material. However, this can cause ink smear when the moisture or grease of the product within or while filling the bag migrates through the woven bag material to contact and re-liquefy the water based ink.

Figure 1:
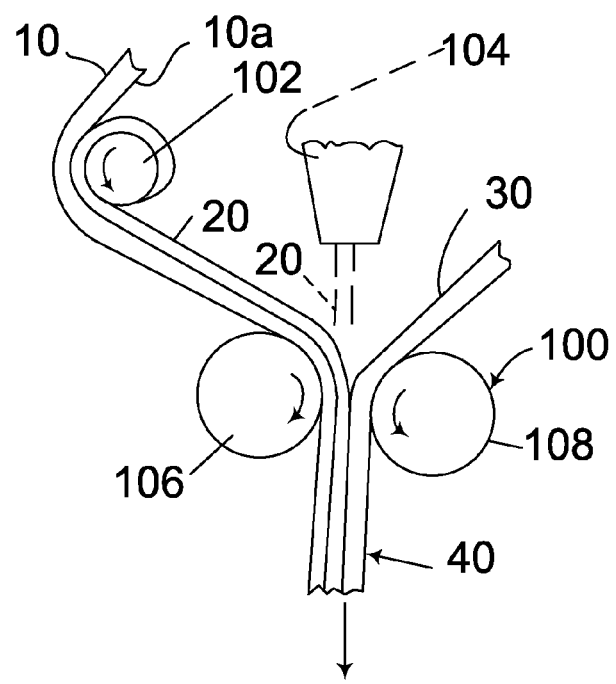
FIG. 1 is a schematic view of a manufacturing apparatus performing a method of making a composite having a transparent outer film having a printed area that repeats along a continuous length of the film, an adhesive layer and another film adhered by the adhesive layer to the outer film.

FIG. 1 discloses a portion of a transparent continuous poly film 10 having a reverse printed area 10a. The printed area 10a repeats along a length of the continuous poly film 10 to correspond with each bag or package 70, FIGS. 3 and 4, that is formed, in part, by the continuous film 10. The repeated reverse printed area 10a is bounded by an unprinted top margin forming a top of a bag type package 70, an unprinted bottom margin forming a bottom of the bag type package 70 and unprinted side margins 40b, 40c.

Each repeated printed area corresponds to a printed area on a woven bag product 70, in one embodiment having the printed area visible on at least one broad side or front of the bag 70 and, in another embodiment, preferably on both sides, front and back, of the bag 70. In a further embodiment, the printed area extends over sides 70a, 70b of the bag 70, which sides 70a, 70b expand and contract with the amount of contents within the bag 70.

FIG. 1 discloses an apparatus 100 for making a composite 40. The composite 40 comprises the reverse printed film 10 having the printed area 10a, an adhesive layer 20 or tie layer applied to the printed side of the reverse printed film 10 by an adhesive applicator roller 102 of the apparatus 100. Alternatively, the adhesive layer 20 comprises a poly laminate 20 extruded as a heated film or sheet from an extruder 104 shown in phantom outline. The film 10 can be printed utilizing ink 10a with a solvent based carrier (called solvent printing) or utilizing a water based carrier (called water based printing). Water based printing has been growing in use over the past decade due to the need to reduce ink solvent emissions and waste treatment. Printers utilizing solvent based printing need solvent recovery systems or incinerators to burn off excess solvent rather than emitting it to the environment. These solvents like toluene are known carcinogens. Printing with water based inks 10a causes little or no solvent emissions and is better for the environment. However when making bags 70, FIGS. 3 and 4, for foods that are packaged hot (+90° F.) or that have excess grease (mainly animal feeds like dog food) the water based ink 10a can be attacked by water vapor or grease migrating from the bag contents. This will cause the ink 10a to degrade and run or smear when contacted by and mixed with moisture vapor. The result is smeared printing 10a. Further, the ink 10a and the migrating bag contents cross contaminate one another.

FIG. 1 discloses laminating nip rollers 106, 108 of the apparatus 100, which counter rotate to apply pressure and necessary heat to an adherent state temperature to laminate the layers 10, 10a, 20 and 30 and form the flexible composite 40.

Figure 3:
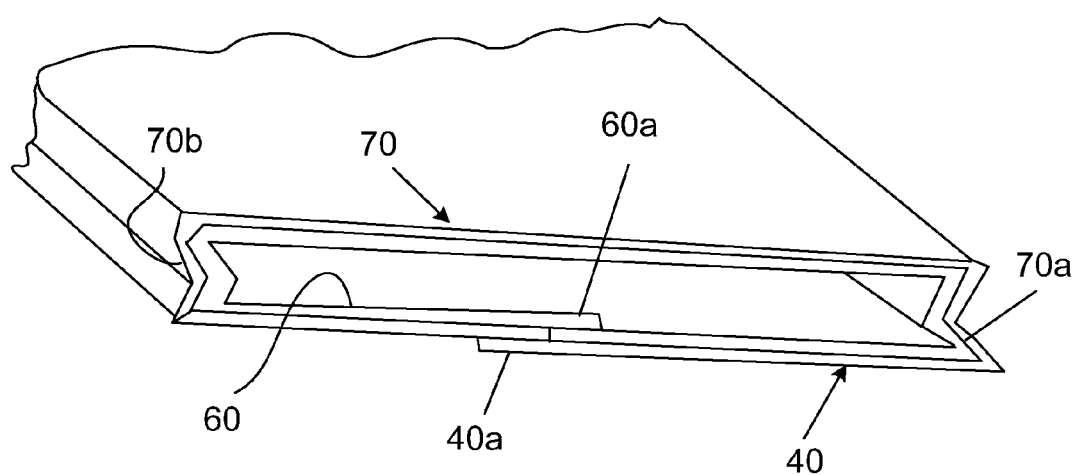
FIG. 3 is a schematic view in cross section of one embodiment of a woven bag.
Figure 4:
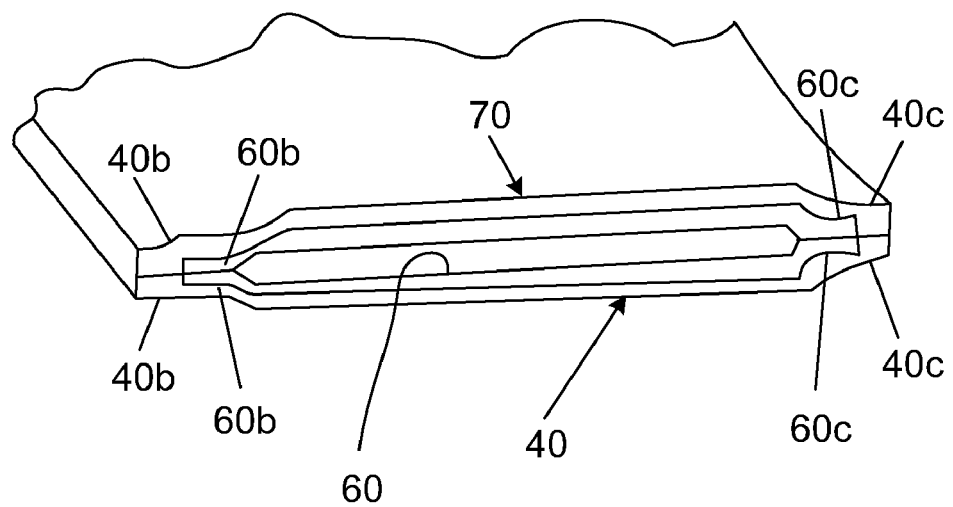
FIG. 4 is a schematic view in cross section of another embodiment of a woven bag.

By making a bag 70, FIGS. 3 and 4, having a composite 40 that comprises a reverse printed film 10 laminated to another layer of film 30 the print 10a is now confined between the two film layers 10, 30 so that it is isolated between the two films 10, 30 from mutual cross contamination and attack by moisture or grease. Further, the print 10a is protected by an intervening film 30 from abrasion by the woven bag material 60, FIGS. 2, 3 and 4, that forms an enclosure to contain the bag contents.

A preferred embodiment of the invention comprises: printed clear poly film 10 (with a thickness in a range of about 9 microns to about 150 microns, including, but not limited to a preferred thickness of about 18 microns) adhesive or poly laminated (with about 0.5 to about 20 pounds of adhesive 20 or alternatively, poly laminate 20, per 3,000 sq feet of film) to another film 30, for example, (clear, colored, metallized, or treated in some way), (with a thickness in a range of about 9 microns to about 150 microns, including, but not limited to a preferred thickness of about 18 microns).

Figure 2:
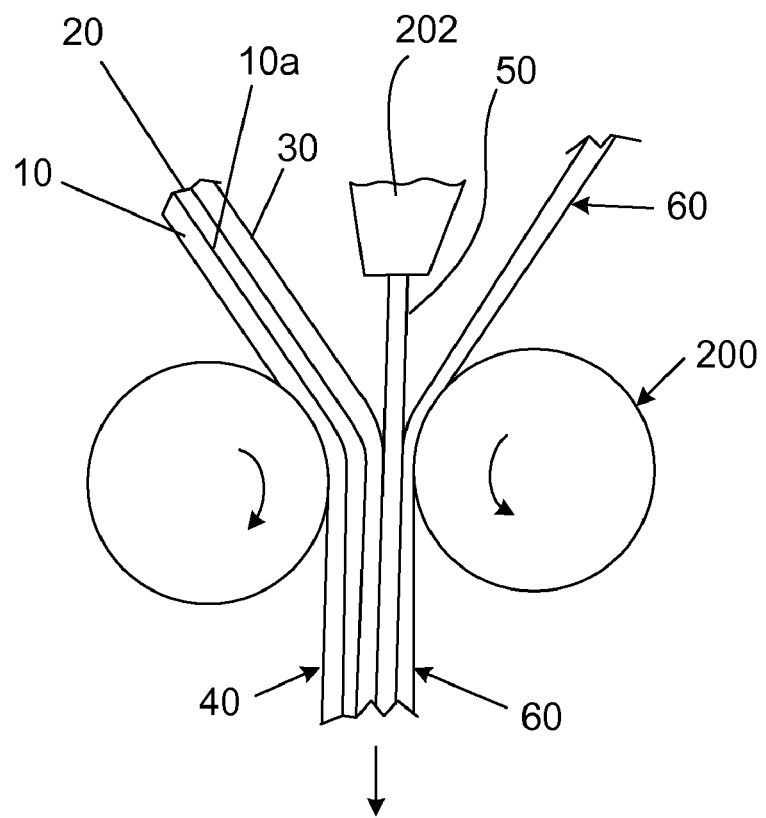
FIG. 2 is a schematic view of a manufacturing apparatus performing a method for making a woven bag from the composite of FIG. 1 and woven bag material.

In FIG. 2, the film lamination comprises a composite 40 that is then poly laminated by an apparatus 200 (with about 5 to about 30 pounds of poly laminate 50 or, alternatively, adhesive layer 50, per 3,000 sq feet) applied as a heated film or sheet of poly laminate by an extruder 202 of the apparatus 200, to a woven mesh tube 60 or flat sheet 60 (with a basis weight of about 30 to about 100 pounds per 3,000 sq feet of a single ply of woven). Alternative to the poly laminate 50, an adhesive layer 50 is applied by another applicator roller similar to the applicator roller 102 shown in FIG. 1. All product weights are based on a single layer of the structure, i.e. if it is a tube it is one side or layer of the tube. The material structure is then formed or cut into a bag 70. The final structure comprises, film 10/print 10a/adhesive 20 or poly 20/film 30/poly 50 or adhesive 50/woven bag material layer 60.

An alternative embodiment of the invention replaces the adhesive layer 20 with about 5 to about 30 pounds per square feet of poly 20. The resulting structure comprises the successive layers of film 10/print 10a/poly 20/film 30/poly 50/woven bag material layer 60.

Another alternative embodiment of the invention replaces the poly layer 50 with an adhesive layer 50 (about 0.5 to about 20 pounds per 3,000 sq ft). The resulting structure comprises film 10/print 10a/adhesive 20/film 30/adhesive layer 50/woven bag material layer 60.

A best mode process for carrying out the invention is to reverse print the printed matter 10a, on film 10 on a wide web press, then lamination of the reverse printed film 10 to another film 30 utilizing an adhesive laminator (EB, electron beam, solvent-less, water-based or other), and then lamination of the laminated film composite 40 to the woven bag material 60 using a poly extruder laminator 202. The alternatives use either the poly extruder laminator 202 for both laminations, FIGS. 1 and 2, or the adhesive laminator 104 for both laminations, FIGS. 1 and 2.

A first polymer film 10 includes, but is not limited to, one of, an oriented polypropylene, OPP, or oriented polyethylene, OPE, biaxial oriented polypropylene, BOPP, or biaxial oriented polyethylene, BOPE, polyester, PET, or other polymer film having an unprinted side with a matt finish or shiny finish, and an opposite side of the same film adapted for printing 10a thereon by being treated, for example, corona, flame, chemical or plasma treatment to increase the adherence of printing inks. The film 10 is reverse printed with printed matter 10a, text and graphics, in reverse or mirror image orientation, which is viewed in a readable orientation by looking through the unprinted side of the transparent first film 10.

The printing operation comprises, reverse printing the treated side of the first film 10 with a printer apparatus including but not limited to, flexographic, rotogravure or other printer apparatus, with a printing image width of about 25-75 inches and an individual repeat length corresponding to the span of successive bags 20-50 inches each, and joined side-to-side or end-to-end along a continuous length of the first film 10. The printing image 10a comprises various text and/or graphics, suitable to print one or both sides of a bag 70 at once. From the printer the first film 10 is wound onto a take up reel (not shown).

A second polymer film 30 comprised of a polymer material similar to the material of the first film 10 is laminated over the reverse printed matter 10a on the treated side of the first film 10. The second polymer film 30 is commercially available as transparent, white or metallized with imbedded metal particles. An adhesive laminator machine 100, commercially available from NORDMECCANICA GROUP, FEUSTERTEL or DCM, for example, includes but is not limited to, a solvent less adhesive laminator machine or electron beam, EB, adhesive laminator machine that applies an adhesive 20 including, but not limited to, a solvent less polyurethane adhesive or EB (electron beam) radiation cured acrylate adhesive 20 to the surface of either the first film 10 or the second film 30. The second film 30 is laminated against the printed side of the first film 10, including but not limited to the use of nip rollers 106, 108 at an elevated temperature as required by the adhesive manufacturer to activate the adhesive to an optimum adherent state.

A tubular woven bag material 60 or fabric provides a reinforcing mesh for the bag 70. For example, the fabric 60 comprises a uniform weight and poly profile in the machine direction and cross direction.

For example, the mesh 60 comprises, about 10×10 picks per inch of warp and weft yarns of about 850 Denier minimum, low density polyethylene about 60% resin blended copolymer with about 40% polypropylene resin, the mesh having a polymer basis weight of about 16.6 and a coefficient of friction of about 0.5 as measured by the inclined plane method. The tubular woven mesh has a total basis weight range of about 72.3-78.9 gm/m$^2$, including preferably a basis weight of about 75.6 gm/m$^2$.

FIG. 2 discloses, an extrusion laminate of either side of the woven bag material 60 laminated to the untreated, unprinted plain side of the laminated composite 40. The woven bag adhesion withstands about 300 grams minimum force.

FIG. 3 discloses an embodiment of a bag 70, product or package, in which the woven bag material 60 is in the form of a single layer tube, such that the tube has an overlap seam 60$a$ or alternatively is a seamless tube without an overlap seam 60$a$. The composite 40 comprises a single piece having an overlap seam 40$a$. The bag 70 is shown partially open for purposes of illustration. During lamination, the bag 70 is formed while collapsed and flat. After laminating together the composite 40 and the woven bag material 60, they are cut to a length that corresponds to the length of an individual bag 70. An individual bag 70 will have open ends. Either or both open ends of the individual bag 70 are capable of being closed and sealed in a similar fashion as disclosed by FIG. 4, wherein FIG. 4 depicts margins 60$b$, 60$c$ of the woven bag 60 joined together, and margins 40$b$, 40$c$ of the composite 40 joined together, by melt bonding together under heat and pressure, or by the addition of adhesive to adhesive bond together.

FIG. 4 discloses an embodiment of a bag 70, product or package, in which the woven bag material 60 is in the form of a flat sheet of fabric, which is slit to form two pieces with side margins 60$b$ and 60$c$. The two pieces are laminated to each other along the side margins 60$b$ and 60$c$. The composite 40 is slit to form two pieces covering the two opposite sides of the woven bag material 60. The two pieces of the composite 40 are laminated to the sides of the woven bag material 60, and further are laminated together along their side margins 40$b$ and 40$c$. The bag 70 is shown partially open for purposes of illustration. During lamination, the bag 70 is formed while collapsed and flat. The side margins 40$b$ and 40$c$ are trimmed to size. The side margins 60$b$ and 60$c$ are trimmed to size if necessary. After laminating together the composite 40 and the woven bag material 60, they are cut to a length that corresponds to the length of an individual bag 70. An individual bag 70 will have open ends, either one or both of which are capable of being closed. By way of example, either or both open ends of the individual bag 70 are capable of being closed along margins adjacent the open ends in a similar fashion as disclosed by FIG. 4, wherein FIG. 4 depicts margins 60$b$, 60$c$ of the woven bag 60 joined together, and margins 40$b$, 40$c$ of the composite 40 joined together, by melt bonding together under heat and pressure, or by the addition of adhesive to adhesive bond together.

Each of the films according to the embodiments of the invention resides in an unreinforced, heavy duty film of sufficient flexural modulus to form a flexible bag of sufficient tensile strength and sliding friction constant, elongation resistance, abrasion resistance and impact resistance at ambient temperatures, which is particularly suited for rough handling of bulk food quantities during shipment and storage. Further, the polymer and film have no solvent at room temperature, are sensitized for printing, and are heat, water and moisture resistant, staining resistant, and chemical resistant to organic chemicals particularly present in bulk food, including but not limited to dog food and birdseed, and further, including but not limited to grains, cereals, oils, grease, gravies and sauces. Accordingly, the polymer and film of the bag are particularly suited for heavy bulk food storage and rough handling during shipment and storage. The outer film is capable of being printed with printing ink of water based solvent of low toxicity and low environmental impact when incinerated or recycled. According to an embodiment of the invention one or more of the films comprise heavy duty polypropylene.

This description of the exemplary embodiments is intended to be read in connection with the accompanying drawings, which are to be considered part of the entire written description. Weights, measurements and coefficients are expressed as nominal values including values equal to the expressed values and values about the expressed values. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Patents, patent applications and publications referred to herein are expressly incorporated in their entireties herein. Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A flexible woven bag comprising:
   an outer layer of a first oriented polymer film having reverse printed matter thereon;
   a second oriented polymer film laminated to the first oriented polymer film;
   a laminating polymer or adhesive laminating the second oriented polymer film to the first oriented polymer film;
   a woven bag material layer;
   another laminating polymer or adhesive laminating the second oriented polymer film to the woven bag material layer;
   the printed matter being between the first and second oriented polymer films while the oriented second polymer film isolates the printed matter from cross contamination with contents intended for the flexible woven bag;
   the woven bag material layer being the final structure inside the bag; and
   the first oriented polymer film, the laminating polymer or adhesive, the second oriented polymer film and said another laminating polymer or adhesive providing a flexible composite, and the flexible composite enclosing the woven bag material layer and protecting the woven bag material layer.

2. The flexible woven bag of claim 1 wherein the printed matter comprises water based ink.

3. The flexible woven bag of claim 1 wherein the second oriented polymer film and the first oriented polymer film are laminated together and are joined at a seam and are laminated to the woven bag material layer, providing a tubular structure.

4. The flexible woven bag of claim 1 wherein the second oriented polymer film and the first oriented polymer film are laminated together and are joined together at side margins and are laminated to the woven bag material layer, providing a tubular structure.

5. The flexible woven bag of claim 1 wherein the woven bag material layer is seamless or has a seam, and the woven bag material layer, the second oriented polymer film and the first oriented polymer film are laminated together providing a tubular structure.

6. The flexible woven bag of claim 1 wherein the woven bag material layer comprises two pieces joined together at side margins, and the woven bag material layer, the second oriented polymer film and the first oriented polymer film are laminated together providing a tubular structure.

7. The flexible woven bag of claim 1 wherein the woven bag material layer comprises two pieces joined together at side margins, the second oriented polymer film comprises two pieces joined together at their side margins, the first oriented polymer film comprises two pieces joined together at their side margins, and the woven bag material layer, the second oriented polymer film and the first oriented polymer film are laminated together providing a tubular structure.

8. The flexible woven bag of claim 1 wherein the outer layer comprises a reverse printed clear polymer film with a thickness of about 40 microns to about 150 microns, which is joined to the second oriented polymer film with an adhesive of about 0.5 to about 20 pounds per 3,000 square feet, and the second oriented polymer film comprises a polymer with a thickness of about 40 microns to about 150 microns.

9. A method of making the flexible woven bag of claim 1, comprising:
laminating the second oriented polymer film to the first oriented polymer film and over the printed matter wherein the laminating polymer or adhesive laminates the second oriented polymer film to the first oriented polymer film; and
laminating the second oriented polymer film to the first oriented polymer film and to the woven bag material layer to provide a tube having open ends, and closing at least one of said ends to form said bag.

10. The method of claim 9, comprising:
laminating the second oriented polymer film to the first oriented polymer film by an adhesive in a thin layer between said first and second oriented polymer films, and activating the adhesive to an adhesive state.

11. The method of claim 9, comprising:
reverse printing the first polymer oriented film before laminating the second oriented polymer film to the first oriented polymer film and over the printed matter to provide the flexible composite.

12. The flexible woven bag of claim 1 wherein the outer layer comprises a reverse printed clear oriented polymer film having a sliding friction constant provided by a matte finish.

13. The flexible woven bag of claim 1 wherein the second oriented polymer film comprises a polymer material having imbedded metal particles.

14. The flexible woven bag of claim 1 wherein each of the first oriented polymer film and the second oriented polymer film comprises polypropylene; and the printed side comprises water based ink.

15. The flexible woven bag of claim 1, comprising:
a layer of adhesive between the flexible composite and the woven bag material layer.

16. The flexible woven bag of claim 1, comprising:
an extruded polymer layer laminated between the flexible composite and the woven bag material layer.

* * * * *